Patented Sept. 27, 1938

UNITED STATES PATENT OFFICE 2,131,141

THERAPEUTICALLY ACTIVE AMIDINES

Karl Miescher, Riehen, near Basel, and Ernst Urech, Basel, Switzerland, assignors to the firm of Society of Chemical Industry in Basle, Basel, Switzerland No Drawing. Application June 15, 1936, Serial No. 85,435. In Switzerland, June 21, 1935

3 Claims. (Cl. 260—564)

This invention relates to an improvement in or a modification of that described in application Serial No. 85,434, filed June 15, 1936, namely the manufacture of new therapeutically active amidines by converting a phenyloxy fatty acid nitrile, amide or thio-amide, substituted in the phenyl nucleus, into a corresponding amidine.

The present invention modifies the said manufacture by using as the parent material a phenyloxy fatty acid nitrile, amide or thio-amide which is not substituted in the phenyl nucleus and converting this body into an amidine substituted at the amidine nitrogen. The compounds produced are useful in therapeutics.

The following examples illustrate the invention the parts being by weight:—

Example 1

21.5 parts of phenoxacetimidoether-hydrochloride (made from phenoxyacetonitrile, alcohol and hydrogen chloride) are shaken with a solution of 12 parts of β-phenylethylamine in alcohol at the ordinary temperature. The clear solution is allowed to stand for some time and then evaporated. Phenoxyethenyl-β-phenylethylamidine-hydrochloride of the formula

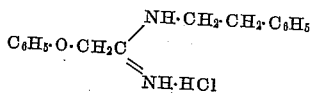

separates in the form of a colourless crystalline powder, melting at 201–203° C. and freely soluble in water.

Instead of with β-phenylethylamine the reaction may also be carried out in similar manner for example with phenylethyl-N-methylamine, piperidine or piperidine-ethylamine.

Example 2

24.5 parts of phenoxybutyrimidoether-hydrochloride (made from α-phenoxy-n-butyronitrile, alcohol and hydrogen chloride) are mixed with an alcoholic solution of 13 parts of di-n-butylamine. After 15 hours the clear solution is evaporated and the residue recrystallized from acetone. The α-phenoxy-n-butenyl-di-n-butylamidine-hydrochloride thus obtained and having the formula

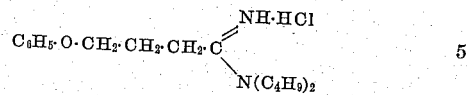

is a colorless crystalline powder melting at 117–118° C.

Instead of di-n-butylamine there may also be used another amine, such as for example diethylamine, methyl-ethyl-amine, benzylamine or diethylamino-ethylamine.

Instead of α-phenoxy-n-butyronitrile one may start for instance from α-phenoxy-n-butyronitrile of the formula

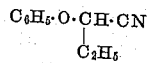

What we claim is:—

1. Phenyloxy-alkylene-amidines unsubstituted in the phenyl nucleus and substituted in the amino group of the amidine group by a radical selected from the group consisting of alkyl, phenalkyl and alkyl amino alkyl, the alkyl radicals being of the lower aliphatic series.

2. The phenoxy-ethylene-β-phenylethyl-amidine of the formula

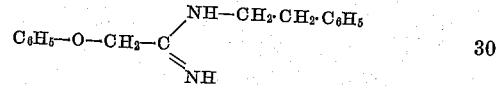

forming a colorless crystalline hydrochloride, melting at 201–203° C., which is freely soluble in water.

3. The α-phenoxy-n-butylene-di-n-butylamidine of the formula

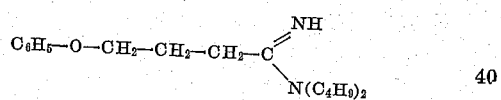

forming a colorless crystalline hydrochloride melting at 117–118° C.

KARL MIESCHER.
ERNST URECH.